(12) United States Patent
Sakaue et al.

(10) Patent No.: US 8,754,919 B2
(45) Date of Patent: Jun. 17, 2014

(54) OPTICAL WRITING UNIT AND IMAGE FORMING APPARATUS INCLUDING SAME

(71) Applicants: Yoshinobu Sakaue, Kanagawa (JP); Noboru Kusunose, Kanagawa (JP); Tomoya Fujii, Kanagawa (JP)

(72) Inventors: Yoshinobu Sakaue, Kanagawa (JP); Noboru Kusunose, Kanagawa (JP); Tomoya Fujii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/729,865

(22) Filed: Dec. 28, 2012

(65) Prior Publication Data

US 2013/0194370 A1 Aug. 1, 2013

(30) Foreign Application Priority Data

Jan. 26, 2012 (JP) ................................. 2012-014427

(51) Int. Cl.
*B41J 15/14* (2006.01)
*B41J 27/00* (2006.01)

(52) U.S. Cl.
USPC ........................................ 347/242; 347/257

(58) Field of Classification Search
CPC .... G02B 26/08; G02B 26/123; G02B 26/125; G03G 15/04036; G03G 15/0435
USPC ......... 347/229, 234, 241–244, 248, 256–261, 347/263; 359/197.1, 212.1, 201.1, 206.1, 359/207.1, 207.5, 207.6, 383, 384, 822
See application file for complete search history.

(56) References Cited

U.S. PATENT DOCUMENTS

| | | | |
|---|---|---|---|
| 7,436,425 B2 | 10/2008 | Yamazaki et al. | |
| 7,535,594 B2 * | 5/2009 | Yoshizawa et al. | ............ 358/1.4 |
| 7,684,100 B2 * | 3/2010 | Amada | ...................... 359/224.1 |
| 2010/0014892 A1 * | 1/2010 | Shimomura | .................. 399/221 |
| 2012/0141168 A1 * | 6/2012 | Makino et al. | ................. 399/221 |
| 2012/0300007 A1 | 11/2012 | Fujii et al. | |

FOREIGN PATENT DOCUMENTS

| | | |
|---|---|---|
| JP | 2002-148551 | 5/2002 |
| JP | 2003-005113 | 1/2003 |
| JP | 2010-096957 | 4/2010 |

OTHER PUBLICATIONS

U.S. Appl. No. 13/716,782, filed Dec. 17, 2012, Arai, et al.

* cited by examiner

*Primary Examiner* — Hai C Pham
(74) *Attorney, Agent, or Firm* — Oblon, Spivak, McClelland, Maier & Neustadt, L.L.P.

(57) ABSTRACT

An optical writing unit includes in a housing a light source projecting a light beam, a deflector to deflect the light beam projected from the light source, a focusing lens, and a lens adjusting device. The focusing lens is long in a main scanning direction and focuses the light beam onto a scan target. The lens adjusting device rotates the focusing lens about a substantially center portion thereof as a rotation fulcrum on a plane perpendicular to an optical path of the light beam so as to adjust the position of the light beam illuminating the scan target. The focusing lens has an asymmetric cross-section relative to a center line of the focusing lens in a direction of the optical path in a sub-scanning plane perpendicular to the main scanning direction, and the center of gravity of the focusing lens is offset from the center line toward the rotation fulcrum.

8 Claims, 12 Drawing Sheets

OPTICAL WRITING UNIT AND IMAGE FORMING APPARATUS INCLUDING SAME

CROSS-REFERENCE TO RELATED APPLICATIONS

This patent application is based on and claims priority pursuant to 35 U.S.C. §119 to Japanese Patent Application No. 2012-014427, filed on Jan. 26, 2012, in the Japan Patent Office, the entire disclosure of which is hereby incorporated by reference herein.

BACKGROUND OF THE INVENTION

1. Field of the Invention

Exemplary aspects of the present invention generally relate to an image forming apparatus, such as a copier, a facsimile machine, a printer, or a multi-functional system including a combination thereof, and more particularly, to an optical writing unit that forms an electrostatic latent image on an image bearing member and an image forming apparatus including the optical writing unit.

2. Description of the Related Art

Related-art image forming apparatuses, such as copiers, facsimile machines, printers, or multifunction printers having at least one of copying, printing, scanning, and facsimile capabilities, typically form an image on a recording medium according to image data. Thus, for example, a charger uniformly charges a surface of an image bearing member (which may, for example, be a photoconductive drum); an optical writing unit projects a light beam onto the charged surface of the image bearing member to form an electrostatic latent image on the image bearing member according to the image data; a developing device supplies toner to the electrostatic latent image formed on the image bearing member to render the electrostatic latent image visible as a toner image; the toner image is directly transferred from the image bearing member onto a recording medium or is indirectly transferred from the image bearing member onto a recording medium via an intermediate transfer member; a cleaning device then cleans the surface of the image carrier after the toner image is transferred from the image carrier onto the recording medium; finally, a fixing device applies heat and pressure to the recording medium bearing the unfixed toner image to fix the unfixed toner image on the recording medium, thus forming the image on the recording medium.

Tandem-type image forming apparatuses are known for forming a multi-color image. Generally, such tandem-type image forming apparatuses are equipped with an optical writing unit that illuminates and scans a plurality of photosensitive members serving as latent image bearing members for different colors arranged in tandem with light beams based on image information. Accordingly, latent images are formed on the surface of the photosensitive members. The latent images are developed with respective colors of development agents such as toner into toner images or visible images. Subsequently, the toner images are transferred onto a transfer member such that they are superimposed one atop the other, thereby forming a composite toner image on the transfer member.

The transfer member may be a belt-type transfer member and a recording medium that directly contacts the photosensitive drums. When using a belt as an intermediate transfer member (hereinafter referred to simply as an intermediate transfer belt), the latent images formed on the photosensitive members are transferred onto the intermediate transfer belt such that they are superimposed one atop the other, forming a composite toner image on the intermediate transfer belt in a process known as a primary transfer process. Subsequently, the composite toner image is secondarily transferred onto a recording medium in a process known as a secondary transfer process.

After the composite toner image is transferred onto the recording medium, the composite toner image is fused and pressed onto the recording medium so that the composite toner image is fixed thereon. After the image is fixed on the recording medium, the recording medium is discharged outside the image forming apparatus.

There is demand for a low-priced and compact image forming apparatus while it provides high imaging quality. In order to achieve high imaging quality, generally, misalignment of toner images, also known as color drift, needs to be prevented by adjusting the position of the light beams projected from the optical writing unit relative to the surface of the photosensitive members. Adjustment of the light beams on the photosensitive drums involves adjustment of the orientation of a long-length lens (such as a toroidal lens) mounted in the optical writing unit.

In a known approach, a color drift detector is provided in the image forming apparatus to detect color drift of images, and in accordance with a detection result, a motor in the optical writing unit is driven to physically change the orientation of the long-length lens, hence adjusting the position of the light beams arriving at the surface of the photosensitive drums. Instead of using the motor, the alignment of the long-length lens may be changed manually.

In another approach for adjustment of the orientation of the long-length lens, the orientation of the long-length lens such a deflecting mirror is adjusted using a jig during manufacture and then fixed to the optical writing unit. In this approach, an additional device for adjustment is not required, thereby providing a low-priced and compact image forming apparatus. However, once color drift occurs, the orientation of the long-length lens or the mirror is difficult to adjust, resulting in degradation of imaging quality.

Alternatively, the image may be corrected using software controlled by a controller and electric control.

In recent years, with the advancement of molding technology for resins, the lens used in the optical writing unit can have a relatively complicated lens surface. Furthermore, in order to shorten a lead time for the molding process, the lens is becoming thinner and smaller. Such a lens can satisfy various performance, but is easily deformed by an external force, resulting in degradation of a beam diameter on the photosensitive members.

If the lens is fixed to the optical writing unit, the desired performance can be achieved reliably. However, when changing the orientation of the lens to correct the beam position on the photosensitive members to correct color drift, the lens gets deformed undesirably, worsening the beam diameter.

To address such a difficulty, upon adjustment of the long-length lens, a contact point of the long-length lens is moved by an adjustment motor, and a spring member such as a leaf spring presses the long-length lens against the contact point to enable the lens to follow the contact point. In another technique, a holder is attached to the long-length lens for reinforcement, and the long-length lens is moved together with the holder.

Although advantageous, if the spring member such as the leaf spring has strong elasticity, the long-length lens that focuses the light beam deflected by the deflector onto a scan target is deformed, and/or the pressure of the spring member exceeds the drive force of the adjustment motor, preventing the light beam from striking a desired position of the photosensitive members and achieving a desired performance. For this reason, the elastic member presses the lens with a minimum required pressure.

There is a drawback in such a optical writing unit in that the contact point and the support point of the focusing lens and a housing of the optical writing unit are easily moved by vibrations, shock, and heat during transportation.

In view of the above, there is thus an unsolved need for an optical writing unit capable of preventing displacement of a lens due to shock and heat while allowing easy adjustment of color drift.

SUMMARY OF THE INVENTION

In view of the foregoing, in an aspect of this disclosure, there is provided an improved optical writing unit including a light source, a deflector, a focusing lens, a lens adjusting device, and a housing. The light source projects a light beam. The deflector deflects the light beam projected from the light source. The focusing lens is long in a main scanning direction and focuses the light beam deflected by the deflector onto a scan target. The lens adjusting device rotates the focusing lens about a substantially center portion thereof as a rotation fulcrum on a plane perpendicular to an optical path of the light beam so as to adjust the position of the light beam illuminating the scan target. The housing houses the light source, the deflector, the focusing lens, and the lens adjusting device. The focusing lens has an asymmetric cross-section relative to a center line of the focusing lens in a direction of the optical path in a sub-scanning plane perpendicular to the main scanning direction, and the center of gravity of the focusing lens is offset from the center line toward the rotation fulcrum.

According to another aspect, an image forming apparatus includes the optical writing unit.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION OF THE INVENTION

Figure 1:
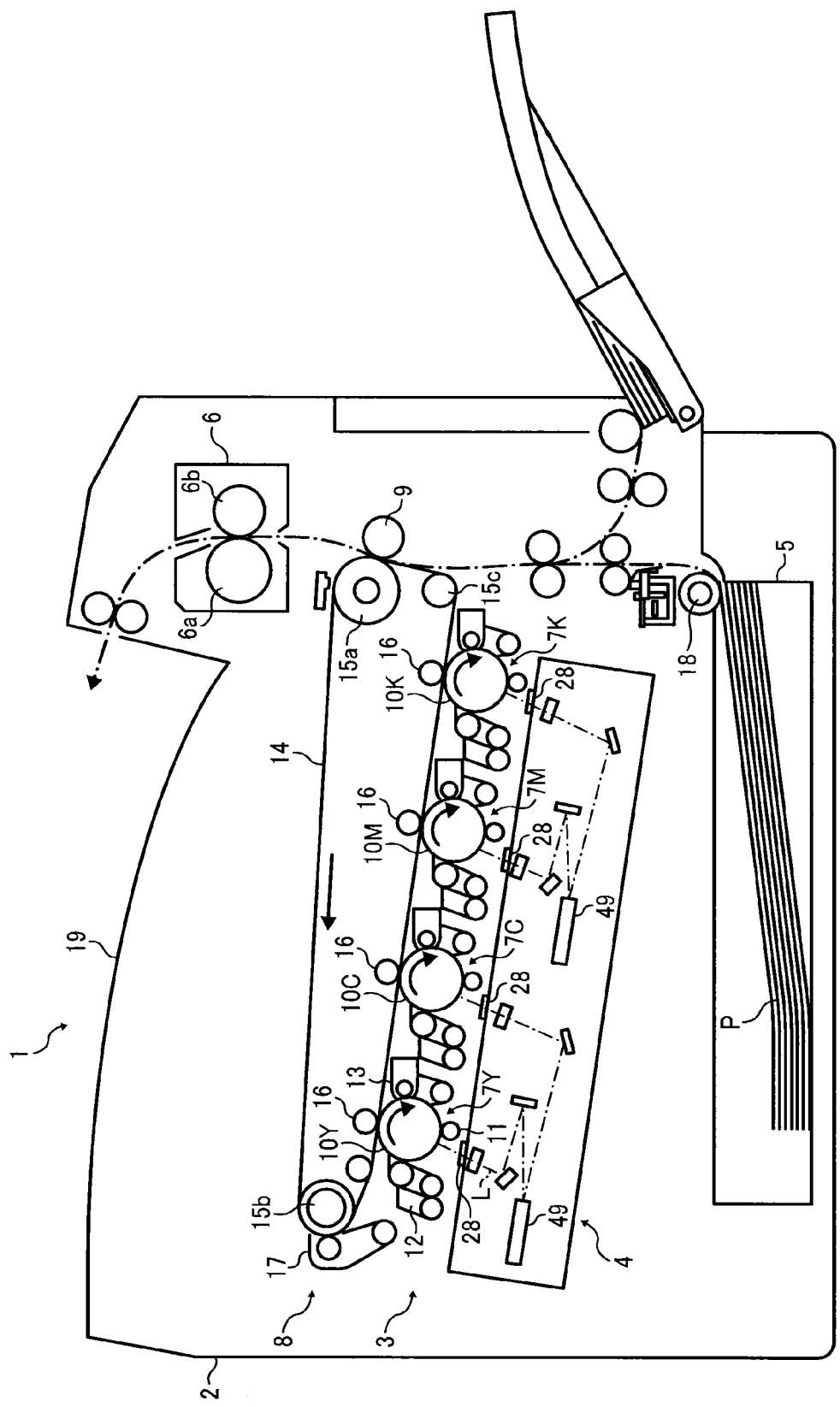
FIG. 1 is a schematic diagram illustrating an image forming apparatus according to an illustrative embodiment of the present invention.

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, and initially with reference to FIG. 1, a description is provided of an image forming apparatus employing an optical writing unit according to an aspect of the present invention.

FIG. 1 is a schematic diagram illustrating an example of an image forming apparatus 1 according to an illustrative embodiment of the present invention. The image forming apparatus 1 is a tandem-type color image forming apparatus in which a plurality of photosensitive drums 10Y, 10C, 10M, and 10K (which may be collectively referred to as photosensitive drums 10), each serving as a latent image bearing member, is arranged in tandem. (In the present illustrative embodiment, four photosensitive drums are provided.)

The image forming apparatus 1 includes a main body 2 and image forming stations 7Y, 7C, 7M, and 7K (which may be collectively referred to as image forming stations 7), each serving as an image forming mechanism in the main body 2. The image forming stations 7Y, 7C, 7M, and 7K include the photosensitive drums 10Y, 10C, 10M, and 10K, one for each of the colors yellow, cyan, magenta, and black, respectively.

It is to be noted that suffixes Y, C, M, and K denote the colors yellow, cyan, magenta, and black, respectively. To simplify the description, these suffixes Y, M, C, and K indicating colors are omitted herein unless otherwise specified.

The image forming apparatus 1 includes an intermediate transfer belt 14 formed into a loop and entrained about three support rollers 15a, 15b, and 15c. Rotation of the support rollers 15a, 15b, and 15c enables the intermediate transfer belt 14 to rotate in a direction of arrow in FIG. 1. The image forming stations 7Y, 7C, 7M, and 7K are arranged in tandem with a certain gap therebetween downstream from the support roller 15b (from the left to the right in FIG. 1), below the looped intermediate transfer belt 14 in a direction of movement of the intermediate transfer belt 14.

When forming a color image, a toner image of a respective color is formed on the photosensitive drums 10Y, 10C, 10M, and 10K. The toner images of different colors are transferred onto the intermediate transfer belt 14 by primary transfer rollers 16 disposed opposite each of the photosensitive drums 10Y, 10C, 10M, and 10K with the intermediate transfer belt 14 interposed therebetween. The primary transfer rollers 16 contact the intermediate transfer belt 14, thereby defining transfer positions therebetween. At the transfer positions, the toner images are transferred onto the intermediate transfer belt 14 such that they are superimposed one atop the other, thereby forming a composite toner image.

The composite toner image is transferred onto a recording medium at a secondary transfer nip at which the support roller 15a and the secondary transfer roller 9 contact via the intermediate transfer belt 14. Subsequently, the recording medium bearing the composite image is delivered to a fixing device 6. The fixing device 6 includes a pair of rollers 6a and 6b, one of which serves as a pressing roller and the other serves as a heating roller. As the recording medium passes through the rollers 6a and 6b, the composite toner image is fused and fixed on the recording medium due to heat and pressure. After the fixing process, the recording medium is delivered to a sheet output tray 19 by sheet delivery rollers. The sheet output tray 19 is formed at the upper surface of the image forming apparatus 1. Accordingly, a color image is formed on the recording medium.

According to the present illustrative embodiment, the intermediate transfer belt 14 is always in contact with the photosensitive drum 10K by the primary transfer roller 16 to accommodate monochrome image formation with black color. A movable tension roller moves the intermediate transfer belt 14 to contact and separate from other photosensitive drums 10 (10Y, 10C, and 10M).

A cleaning device 17 is disposed opposite the roller 15b via the intermediate transfer belt 14. The cleaning device 17 removes residual toner remaining on the intermediate transfer belt 14.

The image forming stations 7Y, 7C, 7M, and 7K all have the same configuration as all the others, differing only in the color of toner employed. Thus, the same reference numerals are given to constituent elements such as parts and materials having the same functions in the image forming stations 7Y, 7C, 7M, and 7K, and the descriptions thereof will be omitted, when discrimination therebetween is not required. A description is provided of the image forming station 7Y as a representative example of the image forming stations.

As illustrated in FIG. 1, components necessary for image forming operation, for example, a charging roller 11 serving as a charger, a developing device 12, the primary transfer roller 16, a cleaning device 13 and so forth are provided around the photosensitive drum 10Y in this order in the clockwise direction indicated by an arrow.

A light beam L projected from an optical writing unit 4 serving as an optical scanner illuminates the photosensitive drum 10Y. The optical writing unit 4 includes a semiconductor laser serving as a light source, a coupling lens, an fθ lens, a toroidal lens, a mirror, a deflector, and so forth. The optical writing unit 4 projects a plurality of light beams L, one for each of the colors yellow, cyan, magenta, and black, towards the respective photosensitive drums 10, thereby forming electrostatic latent images on the photosensitive drums 10. A detailed description of the image formation will be provided later.

The developing device 12 of the image forming station 7Y stores an yellow developing agent and develops the electrostatic latent image formed on the photosensitive drum 10Y with the yellow developing agent into a visible image, known as a toner image.

The developing devises of other image forming stations such as the image forming stations 7C, 7M, and 7K store the respective color of developing agent. Similarly, the electrostatic latent images on the photosensitive drums 10C, 10M, and 10K are developed with the respective color of developing agent.

More specifically, upon image formation, the photosensitive drum 10Y is uniformly charged by the charging roller 11 while rotating. The light beam L containing yellow image information illuminates an image writing position of the photosensitive drum 10Y through a light transmission window 28. Accordingly, an electrostatic latent image is formed on the photosensitive drum 10Y. As the electrostatic latent image passes through the developing device 12, the electrostatic latent image is developed into an yellow toner image.

Subsequently, the yellow toner image formed on the photosensitive drum 10Y is primarily transferred onto the intermediate transfer belt 14. Toner images of other colors cyan, magenta, and black are transferred on top of the yellow toner image which has been transferred on the intermediate transfer belt 14 such that they are transferred one atop the other. Accordingly, a composite color toner image is formed on the intermediate transfer belt 14.

A sheet feeding unit 5 feeds a recording medium P in appropriate timing such that the recording medium P arrives at the secondary transfer nip between the support roller 15*a* and the secondary transfer roller 9 at the same timing at which the composite toner image arrives at the secondary transfer nip. As described above, the composite toner image on the intermediate transfer belt 14 is transferred onto the recording medium P in the secondary transfer nip between the support roller 15*a* and the secondary transfer roller 9.

After the transfer process, the residual toner remaining on the photosensitive drum 10Y is removed by the cleaning device 13. Subsequently, residual charge remaining on the photosensitive drum 10Y is removed in preparation for the subsequent imaging cycle. Similarly, the residual toner and the residual charge are removed from the photosensitive drums 10C, 10M, and 10K. Residual toner and so forth are removed from the intermediate transfer belt 14 by the cleaning device 17.

According to the present illustrative embodiment, the image forming apparatus 1 employs the intermediate transfer method in which the toner images on the photosensitive drums 10 are transferred primarily onto the intermediate transfer belt 14, and then the thus obtained composite toner image is transferred onto the recording medium as described above. Alternatively, the image forming apparatus 1 may employ a direct transfer method. That is, instead of using the intermediate transfer belt, a recording medium conveyance belt carries the recording medium on the surface thereof, and during transportation of the recording medium, the toner images are transferred directly from the photosensitive drums 10 to the recording medium such that they are superimposed one atop the other, forming a color composite image on the recording medium.

Figure 2:
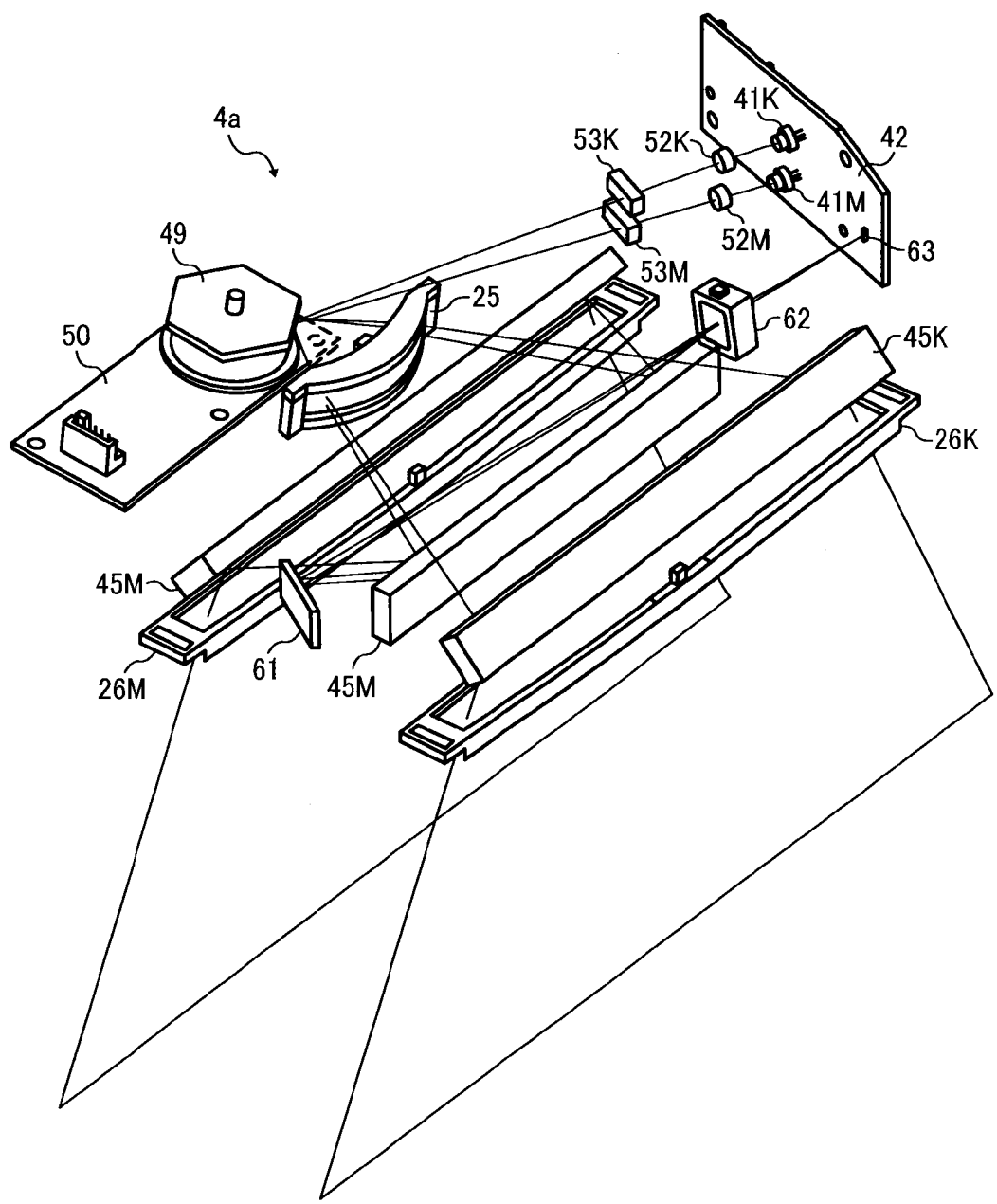
FIG. 2 is a perspective view schematically illustrating a portion of an optical writing unit that scans two photosensitive members in the image forming apparatus of FIG. 1.
Figure 3:
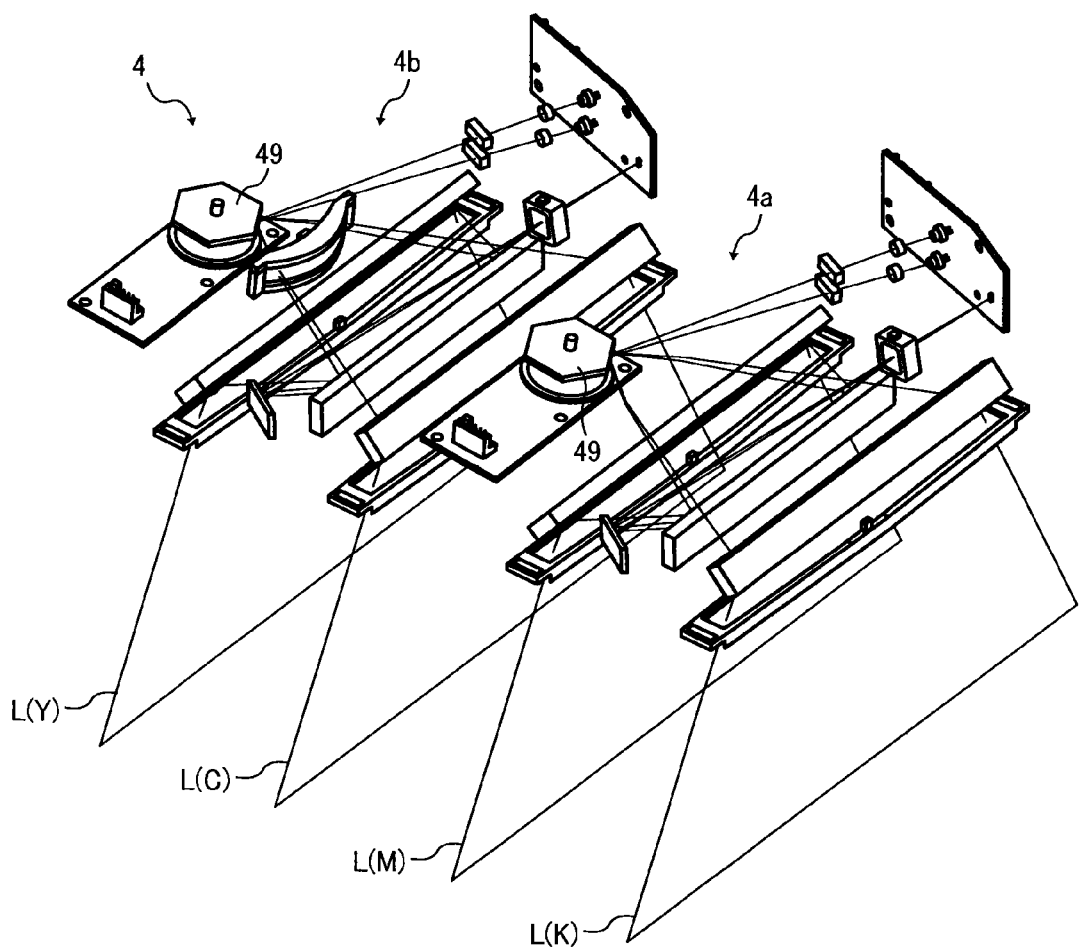
FIG. 3 is a perspective view schematically illustrating an overall structure of the optical writing unit employed in the image forming apparatus of FIG. 1.

With reference to FIGS. 2 through 5, a description is provided of the optical writing unit 4 according to an illustrative embodiment of the present invention. FIG. 2 is a schematic diagram illustrating optical systems for black and magenta of the optical writing unit 4 as viewed from the bottom of the main body 2 of the image forming apparatus 1. FIG. 3 is another diagram schematically illustrating the optical systems for yellow, cyan, magenta, and black, respectively, employed in the optical writing unit 4 as viewed from the bottom of the main body 2 of the image forming apparatus 1. It is to be noted that the suffixes indicating colors are omitted, unless otherwise specified.

As illustrated in FIGS. 1 and 3, the optical writing unit 4 includes two sets of one-side scanning writing systems 4*a* and 4*b* each of which scans simultaneously two photosensitive drums 10. Each of the writing systems 4*a* and 4*b* includes a deflector 50 equipped with a mirror portion (i.e. polygon mirror) 49 comprised of a single stage which light beams from two light sources (described later) strike obliquely. The light sources are arranged with a certain gap therebetween in a sub-scanning direction. It is to be noted that FIG. 1 illustrates only the mirror portion 49.

Figure 4:
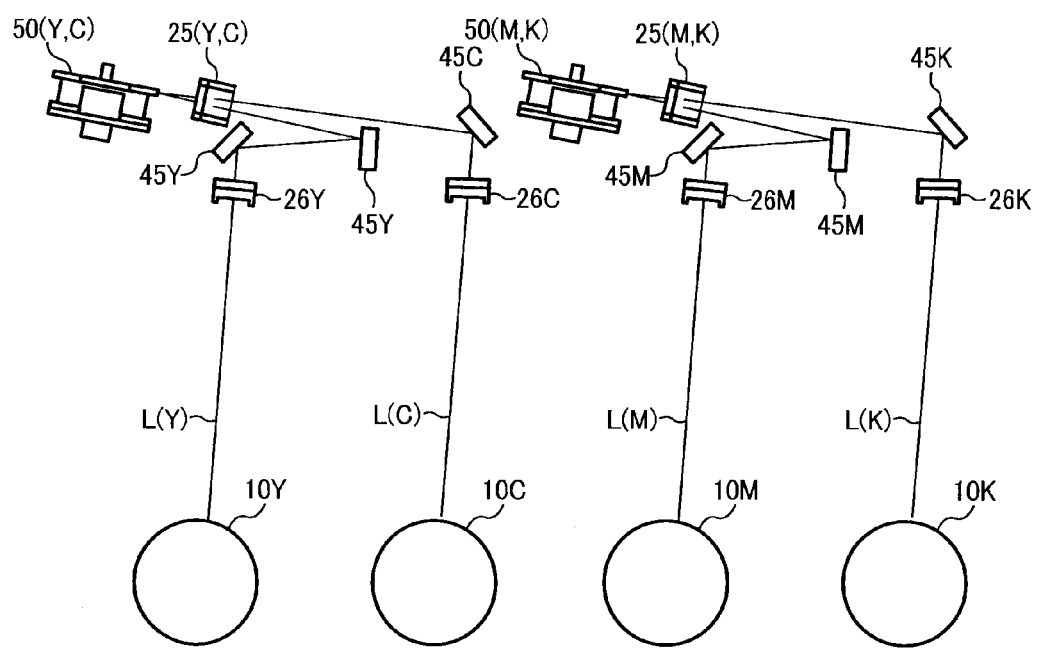
FIG. 4 is a cross-sectional view in a sub-scanning plane schematically illustrating the optical writing unit.
Figure 5:
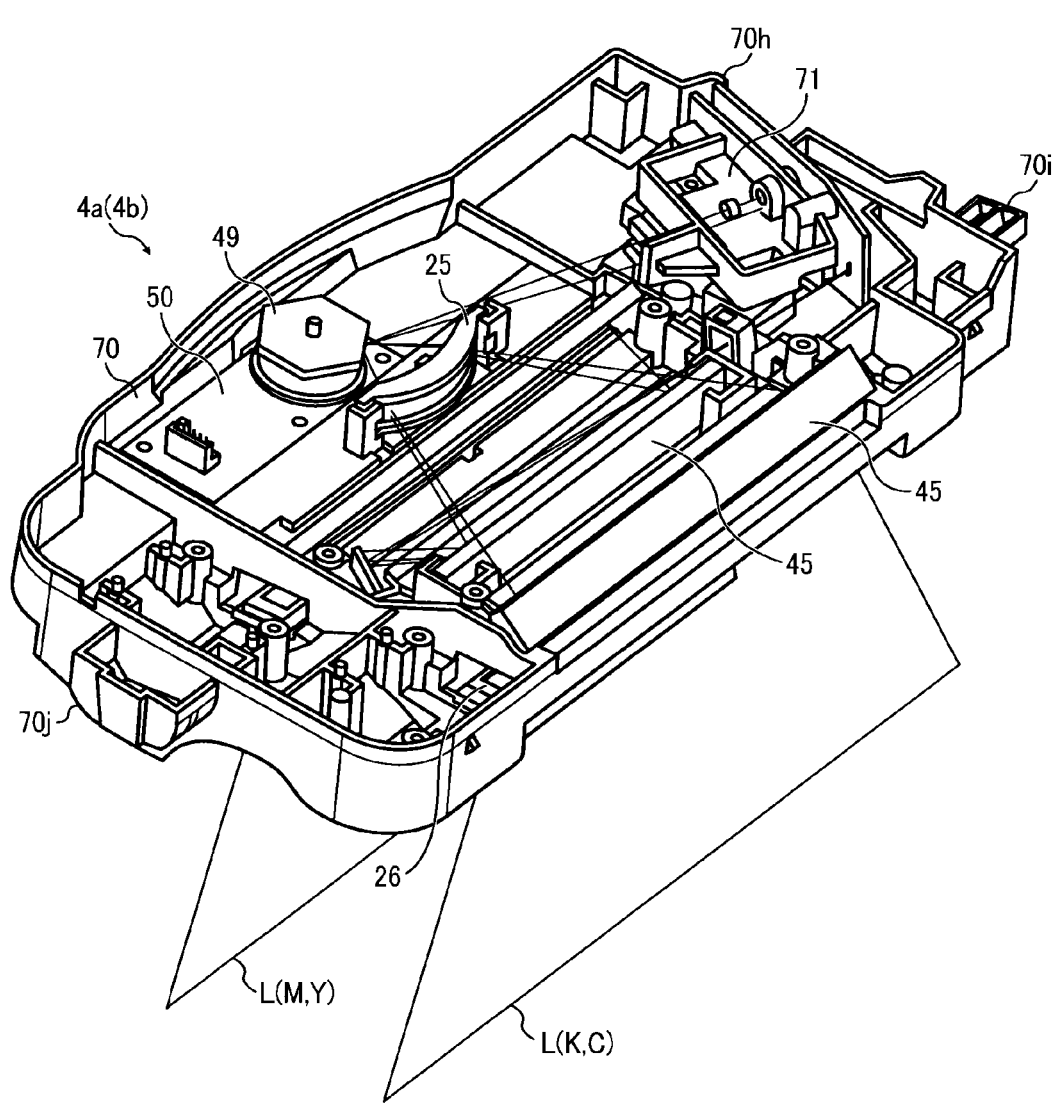
FIG. 5 is a perspective view schematically illustrating the portion of the optical writing unit of FIG. 2 and a housing thereof.

FIG. 4 is a cross-sectional view schematically illustrating the optical systems for yellow, cyan, magenta, and black in the sub-scanning direction. FIG. 5 is a schematic diagram illustrating a support mechanism for supporting the optical systems in the optical writing unit 4 as viewed from the bottom of the main body 2 of the image forming apparatus 1.

According to the present illustrative embodiment, the optical systems are tandem-type optical scanning systems in which scanning lenses are employed. Alternatively, scanning mirrors may be used. The optical writing unit 4 includes optical elements such as the deflectors 50 serving as main-scanning line deflecting mechanisms, reflective mirrors, lenses, and so forth.

As illustrated in FIG. 2, the optical systems for black and magenta in the writing system 4*a* include a light source 41K and a light source 41M, respectively. The light sources 41K and 41M project the light beam L against the photosensitive drums 10K and 10M, respectively. Generally, the light sources (here, the light sources 41K and 41M) employ a semiconductor laser LD which is soldered to a control board 42.

As illustrated in FIG. 2, collimating lenses 52K and 52M, and cylindrical lenses 53K and 53M are disposed on the optical paths of the light beams projected from the light sources 41K and 41M to the mirror portion 49 of the deflector 50. As illustrated in FIG. 4, first scanning lenses (i.e. fθ lenses) 25Y, 25C, 25M, and 25K, second scanning lenses (also referred to as long-length lenses) 26Y, 26C, 26M, and 26K, and folding mirrors 45Y, 45C, 45M, and 45K are disposed on the respective optical paths from the mirror portion 49 to the photosensitive drums 10 corresponding to the light sources 41. The first scanning lenses 25Y, 25C, 25M, and 25K serve as focusing lenses. The second scanning lens 26Y, 26C, 26M, and 26K serve also as focusing lenses or toroidal lenses.

Reflective mirrors may be disposed on the optical paths of the light beams between the light sources 41 and the mirror portion 49 of the deflector 50. As the light beams projected from the light sources 41 pass through apertures, the light beams are shaped into a predetermined shape to form the light beams L. After passing through the apertures, the light beams L strike the cylindrical lenses 53Y, 53C, 53M, and 53K which correct an optical face tangle error of the light beams L.

Subsequently, after passing through the cylindrical lenses 53Y, 53C, 53M, and 53K, the light beams L strike a lateral plane of the mirror portion 49. As the light beams L strike the lateral plane of the mirror portion 49, the light beams L are deflected to scan in the main scanning direction.

The deflected light beams L pass through the first scanning lenses 25Y, 25C, 25M, and 25K, and then are reflected by the folding mirrors 45Y, 45C, 45M, and 45K. The light beams L then pass through the second scanning lenses 26Y, 26C, 26M, and 26K, and illuminate the respective photosensitive drums 10.

A writing start position of black and magenta images is determined such that a synchronous detector detects the light beam L arriving at a photo IC 63 mounted on the control board 42 after the light beam L is reflected by the folding mirror 45K and then a synchronous mirror 61, and passes through a synchronous lens 62. The light beam L to be detected in the synchronous detection may be the light beam L projected from the optical system for magenta.

As for the colors yellow and cyan, as illustrated in FIG. 3, the light beam L to be detected in the synchronous detection may be the light beam L projected from the optical system for yellow corresponding to the photosensitive drum 10Y or the optical system for cyan corresponding to the photosensitive drum 10C.

As illustrated in FIG. 4, the light beams L (Y), L (C), L (M), and L (K) that illuminate the photosensitive drums 10 are parallel to each other and substantially equally spaced. Similarly, the second scanning lenses 26Y, 26C, 26M, and 26K are provided parallel to each other.

The light sources 41, the control board 42, the collimating lenses 52, the cylindrical lenses 53 are held by a holder 71 (illustrated in FIG. 5). The holder 71, the deflector 50, the first scanning lenses 25, the second scanning lenses (long-length lenses) 26, the folding mirrors 45, the synchronous mirror 61, and the synchronous lens 62 are held by a housing 70. The suffixes indicating colors are omitted herein.

Next, with reference to FIGS. 6 through 10, a description is provided of the second scanning lens or the long-length lens 26. It is to be noted that the suffixes Y, C, M, and K indicating the colors are omitted herein.

Figure 6:
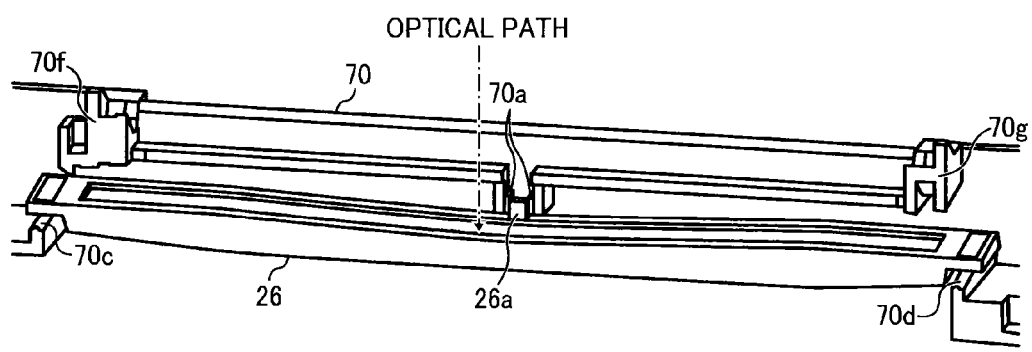
FIG. 6 is a perspective view schematically illustrating a support of a second scanning lens in the housing.
Figure 7:
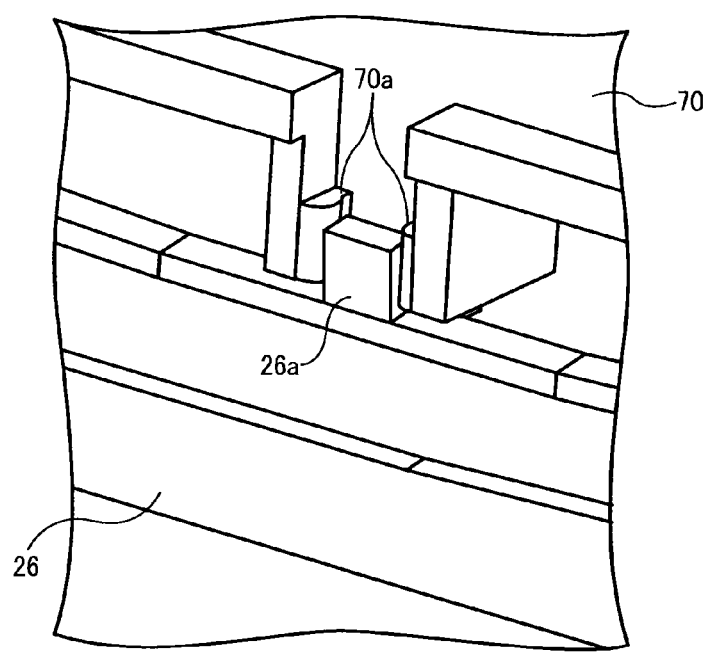
FIG. 7 is a partially enlarged perspective view schematically illustrating a position restriction member that regulates movement of the second scanning lens of FIG. 6 in a main scanning direction.

FIG. 6 is a perspective view schematically illustrating a support mechanism for supporting the second scanning lens 26 in the housing 70. FIG. 7 is a partially enlarged perspective view schematically illustrating substantially the center of the second scanning lens 26 in the longitudinal direction thereof.

As illustrated in FIGS. 6 and 7, the second scanning lens 26 includes a projection 26a substantially at the center thereof. The second scanning lens 26 and the projection 26a are constituted as a single integrated member. The projection 26a is interposed between a pair of restriction members 70a formed on the housing 70. The restriction members 70a are formed substantially in the shape of an arc of a circle and regulate movement of the projection 26a in the longitudinal direction which coincides with a main scanning direction.

Figure 8:
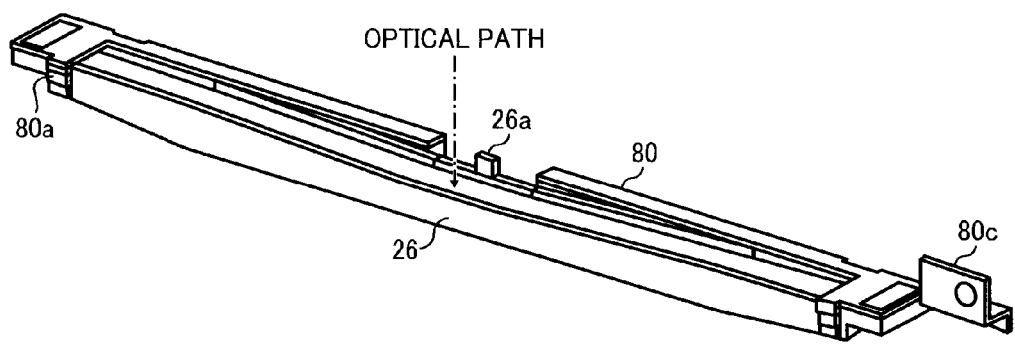
FIG. 8 is a perspective view schematically illustrating the second scanning lens held by a lens holder.
Figure 9:
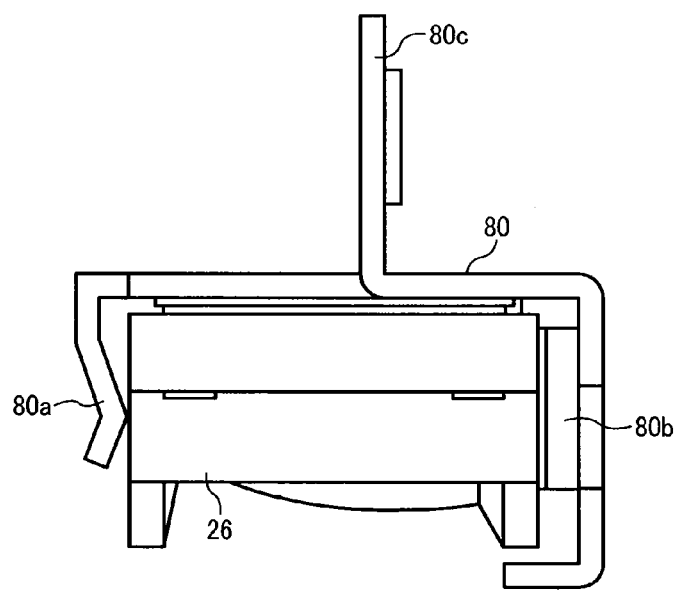
FIG. 9 is a cross-sectional view schematically illustrating the second scanning lens of FIG. 8 in a direction perpendicular to a optical path of a light beam.
Figure 10:
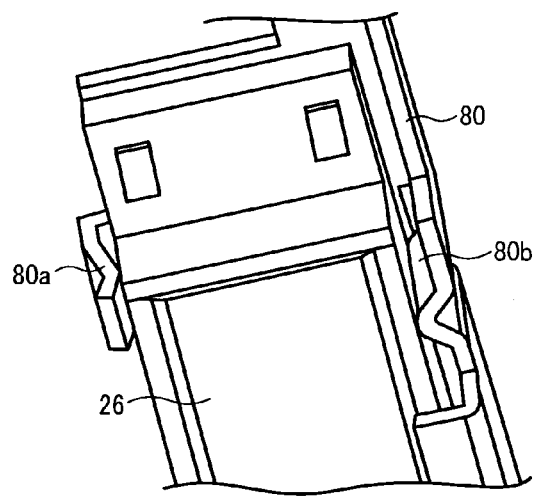
FIG. 10 is a partially enlarged perspective view schematically illustrating the lens holder holding the second scanning lens.
Figure 11:
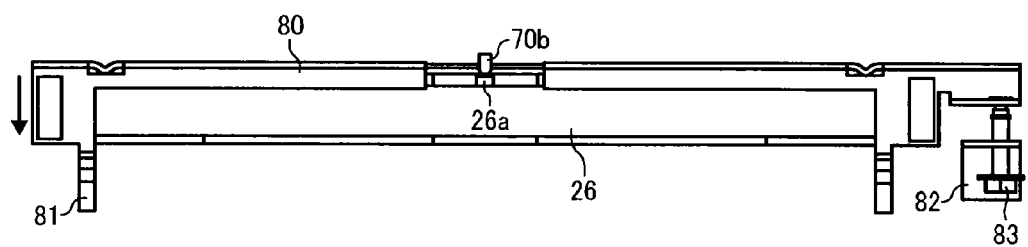
FIG. 11 is a top view schematically illustrating the second scanning lens with respect to a lens adjustment mechanism.
Figure 12:
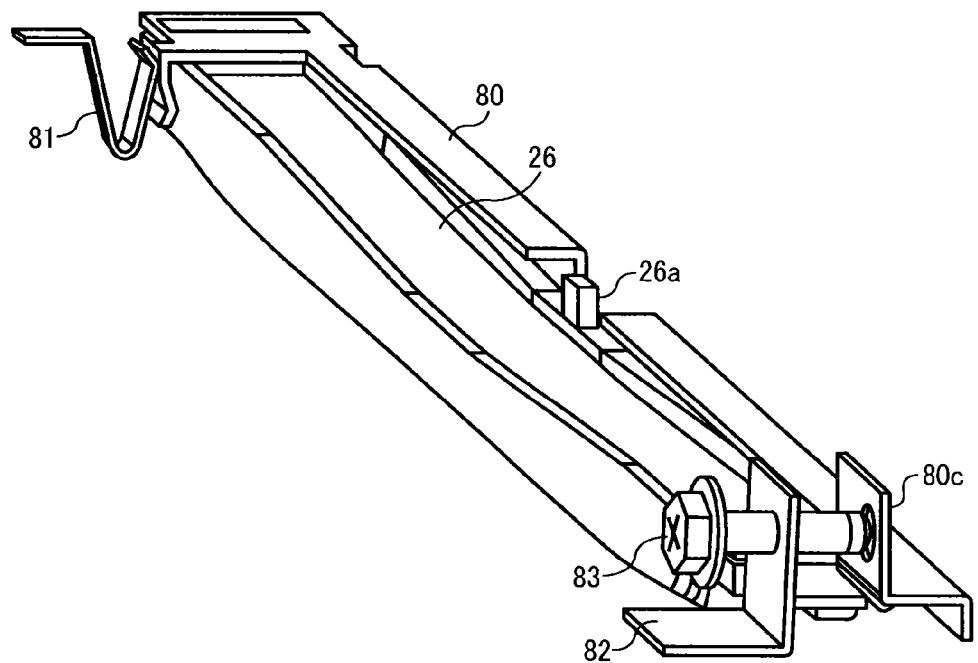
FIG. 12 is a perspective view illustrating the second scanning lens and the lens adjustment mechanism of FIG. 11.

As illustrated in FIGS. 8 through 10, the second scanning lens 26 is held by a lens holder 80 serving as a reinforcing member. When adjusting the position of the second scanning lens 26, the position of the lens holder 80 including the second scanning lens 26 is adjusted. A positioning member 80b and an elastic member 80a are provided at two locations of the lens holder 80 in the main scanning direction. The second scanning lens 26 is pressed against the positioning member 80b by the elastic member 80a. The elastic member 80a may be a leaf spring or the like.

As illustrated in FIGS. 11 through 15, one end of the lens holder 80 in the main scanning direction includes a contact portion 80c. The contact portion 80c projects in a direction of the optical path. A screw holder 82 is attached to the housing 70, facing the contact portion 80c. The screw holder 82 rotatably holds an adjustment screw 83. The tip of the adjustment screw 83 is moved by rotating the adjustment screw 83, thereby moving the contact portion 80c formed on the lens holder 80. The opposed end of the lens holder 80 with the contact portion 80c is pressed by the elastic member 81 which is attached to the housing 70.

The housing 70 includes a rotation fulcrum 70b formed substantially in the shape of an arc of a circle. The rotation fulcrum 70b contacts substantially the center of the side plane of the second scanning lens 26 which is a plane distal to the deflector 50.

Rotation of the deflector 50 generates heat which spreads to the holder 70 that holds the deflector 50. It is difficult to prevent deformation of the housing when the heat is transmitted locally to the housing and the housing reaches a state of thermal equilibrium. However, if the deflector 50 is spaced apart an adequate distance from the housing 70, the effect of deformation of the housing 70 can be reduced. In other words, the housing 70 contacts the side plane of the second scanning lens 26 which is distal to the deflector 50 via the rotation fulcrum 70b. With this configuration, speed of thermal transmission from the housing 70 is reduced. Furthermore, speed of thermal transmission due to airflow generated by rotation of the deflector 50 can be reduced as well.

As illustrated in FIG. 4, the optical paths of the light beams L (Y), L (C), L (M), and L (K) that illuminate the respective photosensitive drums 10 are parallel to each other and equally spaced. Similarly, the second scanning lenses 26Y, 26C, 26M, and 26K are disposed parallel to each other. In this configuration, the rotation fulcrums 70b for the plurality of the second scanning lenses 26 move in the same direction, thus moving the second scanning lenses 26 in the same direction. As a result, the light beams L that illuminate the respective photosensitive drums 10 shift as well, but the relative shift is canceled out so that the amount of total shift is reduced.

Figure 13:
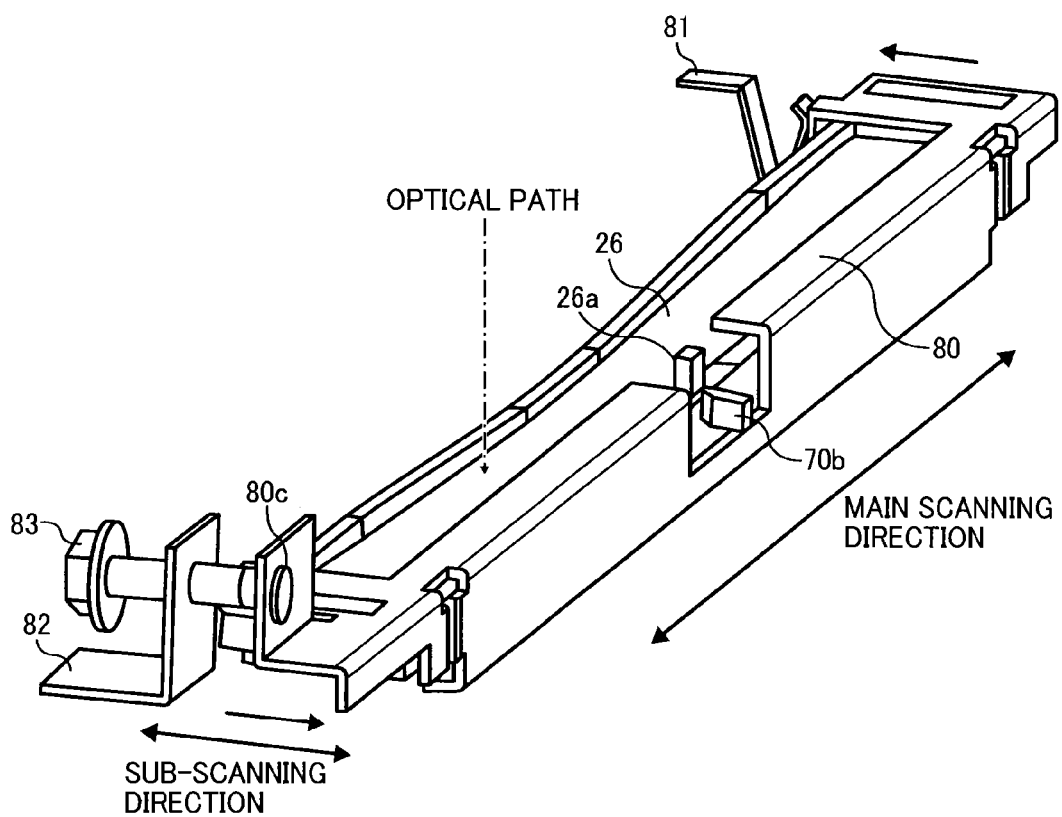
FIG. 13 is a perspective view illustrating the second scanning lens and the lens adjustment mechanism of FIG. 11 as viewed from a different angle.

As illustrated in FIG. 13, as the adjustment screw 83 is rotated, in accordance with the number of rotation of the adjustment screw 83, the lens holder 80 and the second scanning lens 26 rotate about the rotation fulcrum 70b in directions indicated by solid arrows on a plane substantially perpendicular to the optical path. The contact portion 80c, the adjustment screw holder 82, the adjustment crew 83, and the elastic member 81 constitute a focusing lens adjustment mechanism.

It is to be noted that the position of the second scanning lens 26 on the plane perpendicular to the optical path is adjusted by ribs 70c and 70d provided to the housing 70 as illustrated in FIG. 6. The ribs 70c and 70d are formed substantially in the shape of an arc of a circle. With this configuration, the second scanning lens 26 in the height direction is adjusted.

Figure 14:
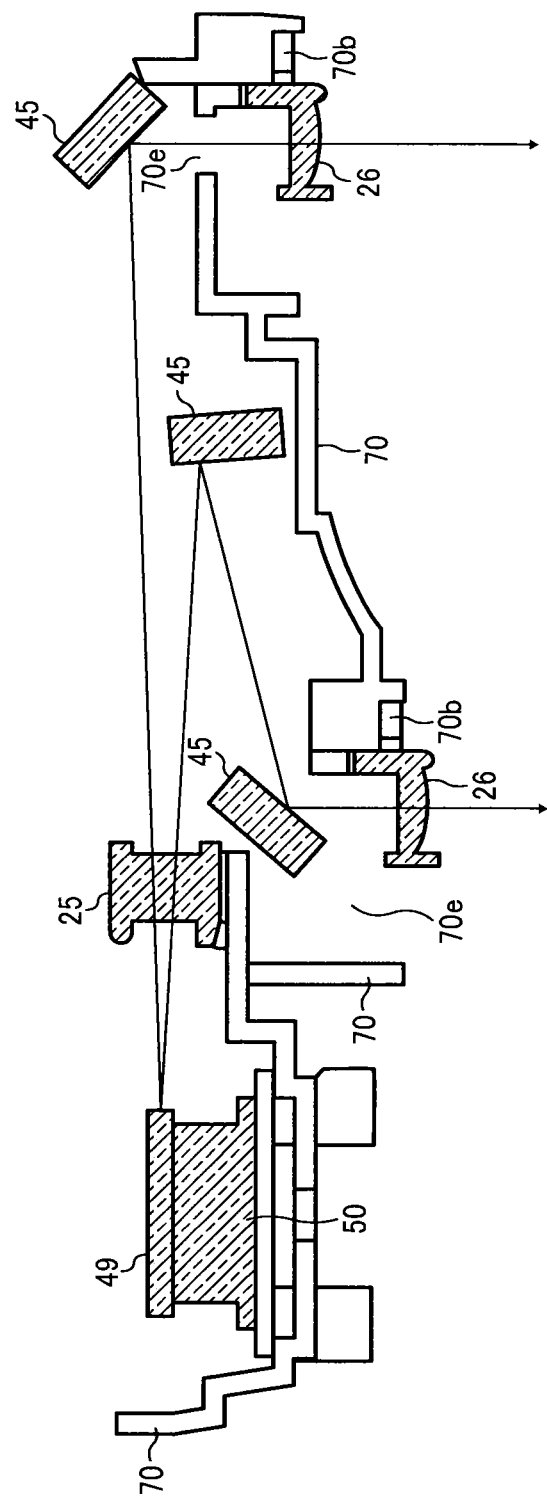
FIG. 14 is a cross-sectional view in the sub-scanning plane schematically illustrating the portion of the optical writing unit which scans two photosensitive members.
Figure 15:
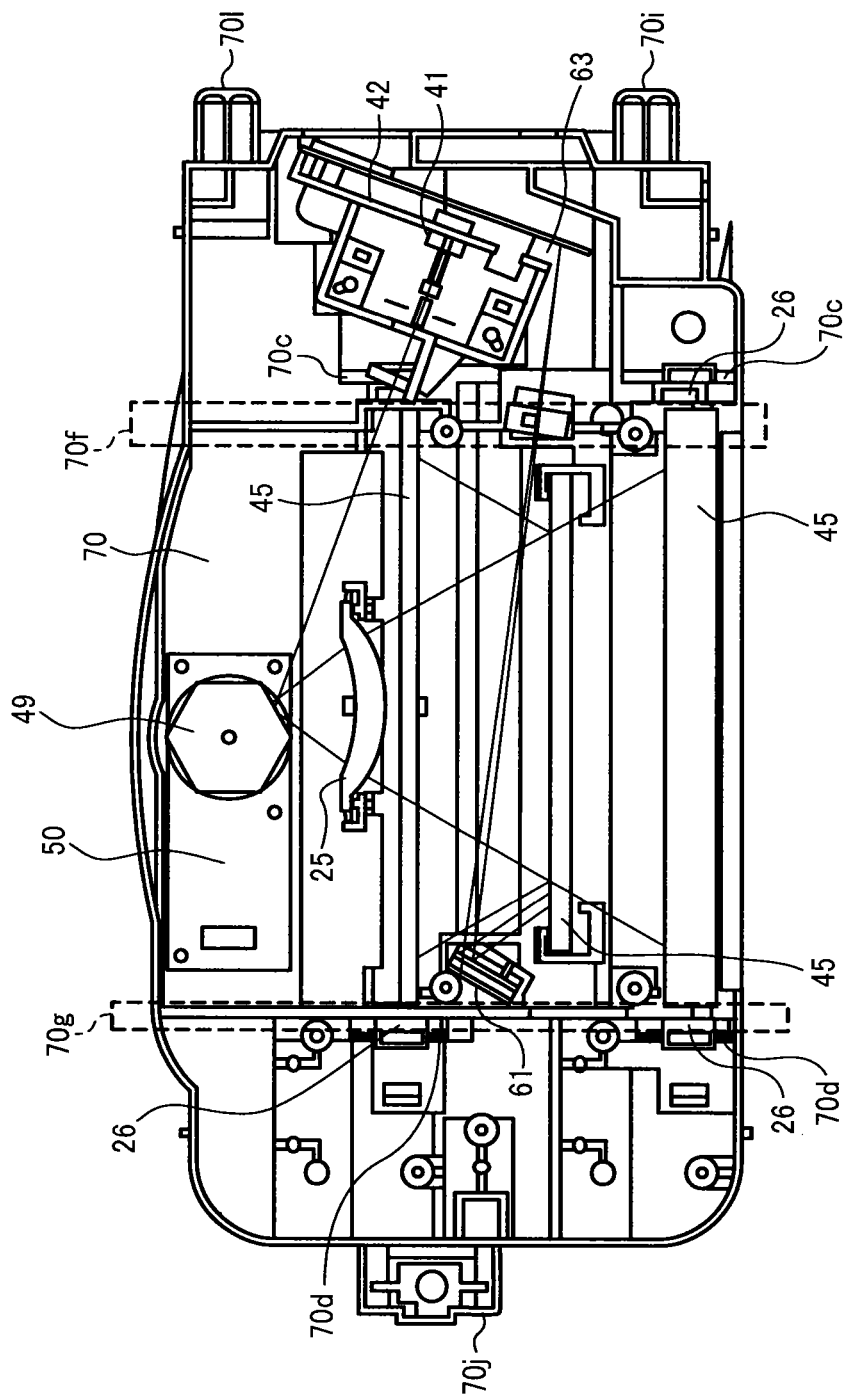
FIG. 15 is a top view schematically illustrating a position of a rib of the optical writing unit which scans two photosensitive members.

With reference to FIGS. 14 and 15, a description is provided of the position of the second scanning lens or the long-length lens 26 in the housing 70. FIG. 14 is a cross-sectional view in the sub-scanning plane perpendicular to the main scanning direction, schematically illustrating the writing system which scans two photosensitive drums 10. FIG. 15 is a top view schematically illustrating the writing system including reinforcing ribs 70f and 70g.

As illustrated in FIG. 14, the rotation fulcrum 70b of the housing 70 contacts the side plane of the second scanning lens 26 distal to the deflector 50 as described above. The housing 70 includes an opening 70e to form a space between the housing 70 and the plane of the second scanning lens 26 which is proximal to the deflector 50. The opening 70e extends in the main scanning direction, thereby allowing the light beam L to pass therethrough. With the opening 70e, thermal deformation of the housing 70 around the deflector 50 does not spread easily to the rotation fulcrum 70b, thereby preventing thermal displacement of the second scanning lens 26.

As illustrated in FIG. 15, the housing 70 includes the reinforcing ribs 70f and 70g disposed across the housing 70 in the direction perpendicular to the main scanning direction. As illustrated in FIG. 6, the ribs 70c and 70d disposed near or outside the reinforcing ribs 70f and 70g contact and support each end of the second scanning lens 26 in the longitudinal direction thereof.

Thermal deformation of the housing 70 originated around the deflector 50 stops at the opening 70e. Although the housing 70 continues to deform around the opening 70e and the deformation reaches the rotation fulcrum 70b, the reinforcing ribs 70f and 70g are disposed around the opening 70e so that deformation near the reinforcing ribs 70f and 70g is reduced even if deformation inside the reinforcing ribs 70f and 70g is significant. Furthermore, deformation of the positioning member and the rotation fulcrum disposed near the ribs is also reduced. In this configuration, heat does not spread easily to the rotary support 70b, thereby preventing thermal deformation of the second scanning lens 26.

The optical writing unit 4 is positioned in place relative to the main body 2 of the image forming apparatus 1 by positioning members 70h, 70i, and 70j disposed outside the reinforcing ribs 70f and 70g.

Figure 16:
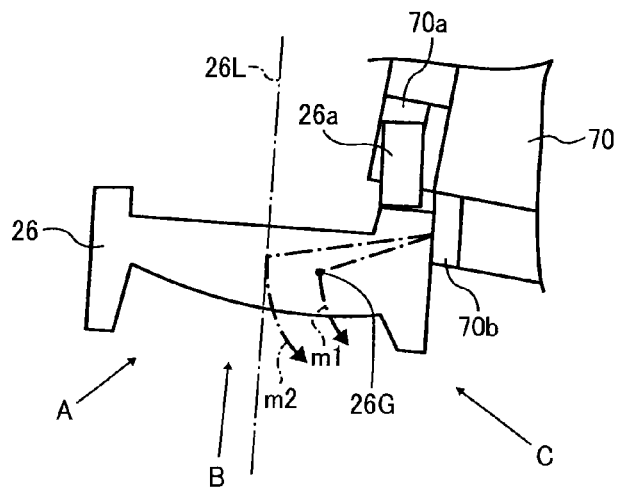
FIG. 16 is a cross-sectional view schematically illustrating the second scanning lens and a rotation fulcrum.
Figure 17:
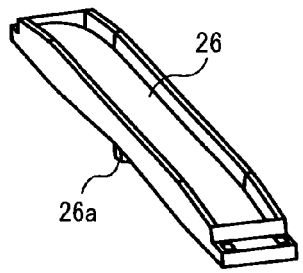
FIG. 17 is a perspective view schematically illustrating the second scanning lens.
Figure 18:
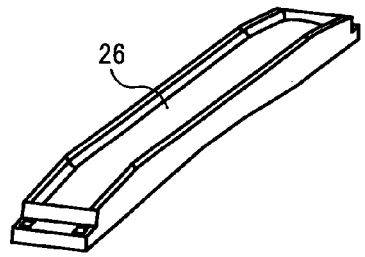
FIG. 18 is a perspective view schematically illustrating the second scanning lens as viewed from a different angle.
Figure 19:
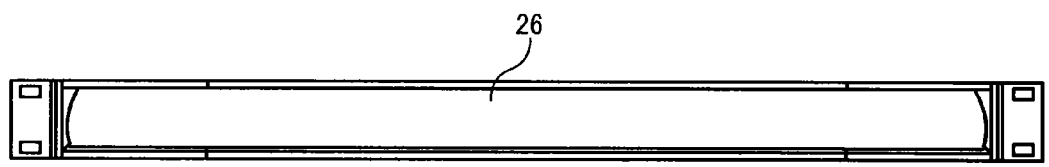
FIG. 19 is a top view schematically illustrating the second scanning lens.

With reference to FIGS. 16 through 19, a description is provided of the shape of the second scanning lens or the long-length lens 26. FIG. 16 is a cross-sectional view in the sub-scanning plane schematically illustrating the second scanning lens 26. FIG. 17 is a perspective view schematically illustrating the second scanning lens 26 as viewed along arrow C in FIG. 16. FIG. 18 is a perspective view of the second scanning lens 26 as viewed along arrow A in FIG. 16. FIG. 19 is a perspective view of the second scanning lens 26 as viewed along arrow B in FIG. 16.

As illustrated in FIGS. 17 through 19, the second scanning lens 26 has a continuous lens surface and is substantially symmetric (left-right) in the longitudinal direction. As illustrated in FIG. 16, the second scanning lens 26 is asymmetrical in the short direction thereof. FIG. 16 illustrates a cross-section of substantially the center of the second scanning lens 26 in the sub-scanning plane or the short direction.

More specifically, as illustrated in FIG. 16, the second scanning lens 26 has an asymmetric cross-section in the sub-scanning plane about a center line 26L of the second scanning lens 26 in the direction of the optical path. The center of gravity 26G is not on the centerline 26L, but at the rotation fulcrum 70b side. With this configuration, a torque m1 is smaller than a torque m2, where the torque m1 is a torque due to the weight of the second scanning lens 26 itself with the contact point with the rotation fulcrum 70b as a reference, and the torque m2 is a torque when the center of gravity 26G is on the center line 26L.

With this configuration, in a case in which shock or vibration in the vertical direction, the horizontal direction, and/or unexpected directions is applied to the device during transportation, or when the device falls, the centrifugal force due to the force and rotation applied to the second scanning lens (long-length lens) 26 is substantially small relative to the rotation fulcrum 70b. Accordingly, the desired position of the second scanning lens 26 is reliably maintained relative to the rotation fulcrum 70b.

According to the present illustrative embodiment, the rotation fulcrum 70b and the housing 70 are constituted as a single integrated member through molding so that the positional accuracy relative to other optical elements held by the housing 70 can be enhanced easily.

According to an aspect of this disclosure, the present invention is employed in the image forming apparatus. The image forming apparatus includes, but is not limited to, an electrophotographic image forming apparatus, a copier, a printer, a facsimile machine, and a multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An optical writing unit, comprising
a light source to project a light beam;
a deflector to deflect the light beam projected from the light source;
a focusing lens to focus the light beam deflected by the deflector onto a scan target, the focusing lens being long in a main scanning direction;
a lens adjusting device to rotate the focusing lens about a substantially center portion thereof as a rotation fulcrum on a plane perpendicular to an optical path of the light beam so as to adjust the position of the light beam illuminating the scan target;
a housing to house the light source, the deflector, the focusing lens, and the lens adjusting device;
a rib disposed across the housing in the direction perpendicular to the longitudinal direction; and
a positioning member to position an end portion of the focusing lens in the longitudinal direction in place with respect to the housing, the positioning member being disposed outside the rib.

2. The optical writing unit according to claim 1, wherein the rotation fulcrum and the housing are constituted as a single integrated member.

3. The optical writing unit according to claim 1, further comprising a mirror to deflect the light beam toward the focusing lens after the light beam is deflected by the deflector, wherein the rotation fulcrum contacts a substantially center portion of a first side plane of the focusing lens which is a plane distal to the deflector.

4. The optical writing unit according to claim 3, further comprising:
a plurality of scan targets onto which a plurality of light beams is focused;
a plurality of focusing lenses, each of which corresponds to each of the plurality of the scan targets, the plurality of focusing lenses arranged parallel to each other in the sub-scanning plane thereof perpendicular to the main scanning direction.

5. The optical writing unit according to claim 1, wherein the housing and a second side plane of the focusing lens which is a plane proximal to the deflector define a continuous space therebetween in the longitudinal direction of the focusing lens to isolate the deflector from the focusing lens.

6. An image forming apparatus for forming an image, comprising:
the optical writing unit of claim 1.

7. The optical writing unit according to claim 1, wherein:
the focusing lens having an asymmetric cross-section in a sub-scanning plane perpendicular to the main scanning direction, the center of gravity of the focusing lens being offset from a center line of the focusing lens toward the rotation fulcrum side, and the center line being in the direction of the optical path.

8. The optical writing unit according to claim 5, wherein:
the focusing lens having an asymmetric cross-section in a sub-scanning plane perpendicular to the main scanning direction, the center of gravity of the focusing lens being offset from a center line of the focusing lens toward the rotation fulcrum side, and the center line being in the direction of the optical path.

* * * * *